(12) United States Patent
Aoki

(10) Patent No.: US 9,434,840 B2
(45) Date of Patent: Sep. 6, 2016

(54) POLYCARBONATE-BASED RESIN COMPOSITION AND MOLDED ARTICLE THEREOF

(75) Inventor: Yusuke Aoki, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 20 days.

(21) Appl. No.: 13/702,858

(22) PCT Filed: Jun. 7, 2011

(86) PCT No.: PCT/JP2011/063050
§ 371 (c)(1),
(2), (4) Date: Dec. 7, 2012

(87) PCT Pub. No.: WO2011/155490
PCT Pub. Date: Dec. 15, 2011

(65) Prior Publication Data
US 2013/0082222 A1 Apr. 4, 2013

(30) Foreign Application Priority Data

Jun. 9, 2010 (JP) ................................ 2010-132484

(51) Int. Cl.
| | | |
|---|---|---|
| C08L 83/06 | (2006.01) | |
| C08L 69/00 | (2006.01) | |
| C08L 83/10 | (2006.01) | |
| C08G 77/448 | (2006.01) | |
| C08K 5/42 | (2006.01) | |
| C08L 27/12 | (2006.01) | |

(52) U.S. Cl.
CPC ............. *C08L 83/06* (2013.01); *C08G 77/448* (2013.01); *C08L 69/00* (2013.01); *C08L 83/10* (2013.01); *C08K 5/42* (2013.01); *C08L 27/12* (2013.01)

(58) Field of Classification Search
None
See application file for complete search history.

(56) References Cited

U.S. PATENT DOCUMENTS

| | | | | |
|---|---|---|---|---|
| 6,657,018 | B1* | 12/2003 | Hoover ........................ | 525/464 |
| 2005/0085580 | A1* | 4/2005 | Marugan et al. ............. | 524/431 |
| 2006/0142486 | A1* | 6/2006 | DeRudder ............... | C08L 51/04 525/71 |
| 2007/0191518 | A1* | 8/2007 | Chen et al. .................... | 524/155 |
| 2007/0299174 | A1* | 12/2007 | Chen et al. .................... | 524/158 |
| 2008/0004397 | A1* | 1/2008 | An et al. .......................... | 525/67 |
| 2009/0118406 | A1* | 5/2009 | Tomoda ........................ | 524/284 |
| 2010/0048779 | A1 | 2/2010 | Hayata | |
| 2011/0077332 | A1 | 3/2011 | Tomoda | |

FOREIGN PATENT DOCUMENTS

| | | |
|---|---|---|
| EP | 0 258 728 A2 | 3/1988 |
| JP | 47 40445 | 10/1972 |
| JP | 8 32820 | 2/1996 |
| JP | 2004 27113 | 1/2004 |
| JP | 2004 536193 | 12/2004 |
| JP | 2005 263908 | 9/2005 |
| JP | 2006 52401 | 2/2006 |
| JP | 2008 208151 | 9/2008 |
| JP | 2009 280636 | 12/2009 |
| JP | 2009 280725 | 12/2009 |
| JP | 2010 37495 | 2/2010 |
| WO | 2007 132657 | 11/2007 |
| WO | WO 2009/145340 A1 | 12/2009 |

OTHER PUBLICATIONS

ASTM D256 Specification, May 1, 2010.*
Lexan EXL 1112T Data sheet, Apr. 5, 2016.*
U.S. Appl. No. 13/883,663, filed May 6, 2013, Aoki.
International Search Report Issued Jul. 19, 2011 in PCT/JP11/63050 Filed Jun. 7, 2011.
U.S. Appl. No. 14/368,122, filed Jun. 23, 2014, Aoki, et al.
European Search Report in corresponding Application No. EP 11 792 447.2 dated Nov. 17, 2014.

* cited by examiner

*Primary Examiner* — Randy Gulakowski
*Assistant Examiner* — Christopher M Rodd
(74) *Attorney, Agent, or Firm* — Oblon, McClelland, Maier & Neustadt, L.L.P.

(57) ABSTRACT

Provided are a polycarbonate-based resin composition that brings together an excellent impact strength and excellent flame retardancy and a molded article thereof. The polycarbonate-based resin composition is a polycarbonate-based resin composition, including, with respect to 100 parts by mass of (A) a resin mixture formed of 30 to 100 mass % of (A-1) a polycarbonate-polyorganosiloxane copolymer which has a constituent unit represented by a general formula (I) and a constituent unit represented by a general formula (II), and in which an average number of repetitions of the constituent unit represented by the general formula (II) is 30 to 500, and 70 to 0 mass % of (A-2) an aromatic polycarbonate resin except the polycarbonate-polyorganosiloxane copolymer, 0.01 to 0.15 part by mass of (B) an alkali metal salt and/or alkaline earth metal salt of an organosulfonic acid, and 0.1 to 1 part by mass of (C) a mixed powder formed of polytetrafluoroethylene particles and organic polymer particles, in which: a content of a polyorganosiloxane block moiety formed of the constituent unit represented by the general formula (II) in the resin mixture (A) is 2 to 30 mass %; and the composition is free of an organohalogen-based flame retardant and an organophosphate-based flame retardant.

9 Claims, No Drawings

POLYCARBONATE-BASED RESIN COMPOSITION AND MOLDED ARTICLE THEREOF

TECHNICAL FIELD

The present invention relates to a polycarbonate-based resin composition excellent in flame retardancy and low-temperature impact characteristic. More specifically, the present invention relates to a resin composition containing, with respect to a resin mixture containing a polycarbonate-polyorganosiloxane copolymer having an organosiloxane block moiety having a specific number of repetitions and a specific structure, an alkali metal salt and/or alkaline earth metal salt of an organosulfonic acid, and a mixed powder formed of polytetrafluoroethylene particles and organic polymer particles, and a molded article obtained by molding the resin composition.

BACKGROUND ART

Polycarbonate resins (PC) produced from bisphenol A and the like have been finding use in many materials for various parts in, for example, an electrical and electronic field, an automobile field, and an architecture field because the resins are excellent in thermal resistance, mechanical properties, dimensional stability, and the like. However, the polycarbonate resin has not obtained enough performance to be used as a material for an outdoor electrical and electronic storage box such as an information communication box, a junction box for photovoltaic power generation, or the like which requires an extremely high degree of impact characteristic at a low temperature of, for example, −40° C. and an extremely high degree of flame retardancy.

In the case of the conventional polycarbonate resin, high flame retardancy can be imparted by using a flame retardant or the like. However, a polycarbonate resin that brings together flame retardancy and a low-temperature impact characteristic, and shows satisfactory performance when put into practical use has not been obtained. For example, it has been known that the addition of an elastomer to the polycarbonate resin improves its impact characteristic. However, its impact characteristic at low temperature is not sufficient. In addition, increasing the molecular weight of the polycarbonate resin improves its low-temperature impact characteristic. However, the increase involves a problem in that its flowability reduces.

In view of the foregoing, a method involving using a copolymer of the polycarbonate resin and any other polymer has been investigated. One example of such copolymer is a polycarbonate-polydimethylsiloxane copolymer (PC-PDMS).

Although the polycarbonate-polydimethylsiloxane copolymer is superior in flame retardancy and low-temperature impact characteristic to the conventional polycarbonate resin, the polycarbonate-polydimethylsiloxane copolymer alone cannot obtain such a high degree of flame retardancy as V-0 based on the UL standard 94. In view of the foregoing, the following method has been proposed for obtaining high flame retardancy (Patent Literature 1). A polycarbonate-polydimethylsiloxane copolymer that has a branched chain and whose polydimethylsiloxane amount is set to 1 mass %, and an organometallic salt are used in combination. Although a maintaining effect on transparency and a preventing effect on a drip at the time of combustion can be expected from the method, the method involves the following drawback. Flowability and a low-temperature impact characteristic reduce.

Meanwhile, a method involving using the polycarbonate-polydimethylsiloxane copolymer, an organobromine compound, and an organometallic salt in combination has been proposed for achieving a high degree of flame retardancy while maintaining the low-temperature impact characteristic (Patent Literature 2). However, the method may result in the generation of dioxins as harmful substances at the time of the combustion of the resin because the organobromine compound is used. In addition, the method involves the following drawback because a polytetrafluoroethylene (PTFE) is added as a drip inhibitor. An impact characteristic at such a low temperature as −40° C. reduces.

In addition, a method involving using an impact modifier and a phosphate-based flame retardant in combination has been proposed with a view to achieving compatibility between the impact characteristic and the flame retardancy (Patent Literature 3). However, the method involves the following drawback because the phosphate-based flame retardant is used. Heat resistance reduces.

Meanwhile, a method involving adding a mixed powder formed of polytetrafluoroethylene particles and organic polymer particles, and a metal salt to a polycarbonate resin has been known (Patent Literatures 4 and 5). However, none of those literatures describes that extremely high flame retardancy and an extremely high low-temperature impact characteristic are obtained by selecting a polycarbonate-polydimethylsiloxane copolymer having a specific number of repetitions of a polydimethylsiloxane and a specific polydimethylsiloxane content as the polycarbonate resin.

CITATION LIST

Patent Literature

[PTL 1] JP 2004-536193 A
[PTL 2] JP 08-32820 B
[PTL 3] JP 2006-52401 A
[PTL 4] JP 2005-263908 A
[PTL 5] JP 2004-27113 A

SUMMARY OF INVENTION

Technical Problem

The present invention has been made to solve the problems of the prior art, and an object of the present invention is to provide a polycarbonate-based resin composition that brings together an excellent low-temperature impact characteristic and excellent flame retardancy without using any halogen- or phosphate-based flame retardant, and a molded article thereof.

Solution to Problem

The inventors of the present invention have made extensive studies with a view to achieving the object, and as a result, have found that the object can be achieved by blending a resin mixture (A) containing a polycarbonate-polyorganosiloxane copolymer having an organopolysiloxane block moiety having a specific number of repetitions and a specific structure with (B) an alkali metal salt and/or alkaline earth metal salt of an organosulfonic acid, and (C) a mixed powder formed of polytetrafluoroethylene particles and organic polymer particles.

The present invention has been completed on the basis of such finding.

That is, the present invention provides a polycarbonate-based resin composition and a molded article obtained by molding the polycarbonate-based resin composition. The polycarbonate-based resin composition is a polycarbonate-based resin composition including, with respect to 100 parts by mass of (A) a resin mixture formed of 30 to 100 mass % of (A-1) a polycarbonate-polyorganosiloxane copolymer which has a constituent unit represented by a general formula (I) and a constituent unit represented by a general formula (II), and in which an average number of repetitions of the constituent unit represented by the general formula (II) is 30 to 500, and 70 to 0 mass % of (A-2) an aromatic polycarbonate resin except the polycarbonate-polyorganosiloxane copolymer, 0.01 to 0.15 part by mass of (B) an alkali metal salt and/or alkaline earth metal salt of an organosulfonic acid, and 0.1 to 1 part by mass of (C) a mixed powder formed of polytetrafluoroethylene particles and organic polymer particles, in which: a content of a polyorganosiloxane block moiety formed of the constituent unit represented by the general formula (II) in the resin mixture (A) is 2 to 30 mass %; and the composition is free of an organohalogen-based flame retardant and an organophosphate-based flame retardant.

[Chem. 1]

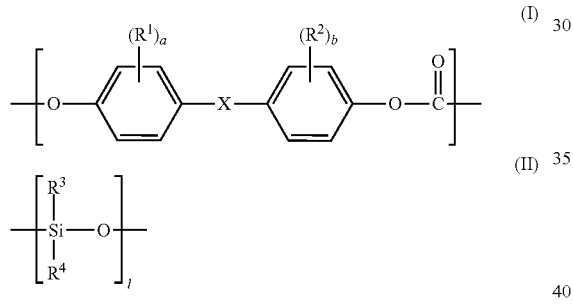

(In the formulae, $R^1$ and $R^2$ each independently represent an alkyl group or alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, $R^3$ and $R^4$ each independently represent a hydrogen atom, or an alkyl group or aryl group which may have a substituent, a and b each independently represent an integer of 0 to 4, and I represents an average number of repeating units and represents an integer of 30 to 500.)

Advantageous Effects of Invention

The polycarbonate-based resin composition of the present invention is free of the possibilities of the generation of a harmful gas at the time of its combustion, the contamination of a molding machine, resin burning, and a reduction in its heat resistance because the composition does not use any halogen- or phosphate-based flame retardant. In addition, the composition can be used as a material for an outdoor electrical and electronic storage box such as an information communication box, a junction box for photovoltaic power generation, or the like which requires extremely high degrees of impact characteristic and flame retardancy because the composition brings together an excellent impact strength and excellent flame retardancy.

DESCRIPTION OF EMBODIMENTS

The present invention provides a polycarbonate-based resin composition and a molded article obtained by molding the polycarbonate-based resin composition. The polycarbonate-based resin composition is a polycarbonate-based resin composition including, with respect to 100 parts by mass of (A) a resin mixture formed of 30 to 100 mass % of (A-1) a polycarbonate-polyorganosiloxane copolymer which has a constituent unit represented by a general formula (I) and a constituent unit represented by a general formula (II), and in which an average number of repetitions of the constituent unit represented by the general formula (II) is 30 to 500, and 70 to 0 mass % of (A-2) an aromatic polycarbonate resin except the polycarbonate-polyorganosiloxane copolymer, 0.01 to 0.15 part by mass of (B) an alkali metal salt and/or alkaline earth metal salt of an organosulfonic acid, and 0.1 to 1 part by mass of (C) a mixed powder formed of polytetrafluoroethylene particles and organic polymer particles, in which: a content of a polyorganosiloxane block moiety formed of the constituent unit represented by the general formula (II) in the resin mixture (A) is 2 to 30 mass %; and the composition is free of an organohalogen-based flame retardant and an organophosphate-based flame retardant.

[Chem. 2]

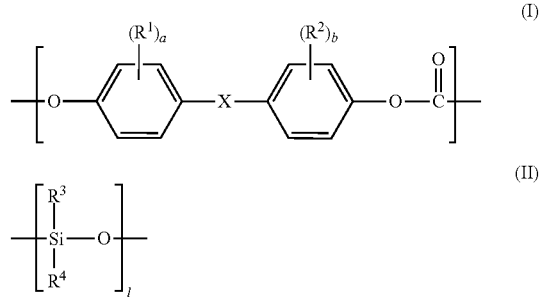

(In the formulae, $R^1$ and $R^2$ each independently represent an alkyl group or alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, $R^3$ and $R^4$ each independently represent a hydrogen atom, or an alkyl group or aryl group which may have a substituent, a and b each independently represent an integer of 0 to 4, and I represents an average number of repeating units and represents an integer of 30 to 500.)

Next, the polycarbonate-polyorganosiloxane copolymer is described.

(A-1) the polycarbonate-polyorganosiloxane copolymer used in the present invention is obtained by copolymerizing a dihydric phenol represented by a general formula (1), a polyorganosiloxane represented by a general formula (2),

[Chem. 3]

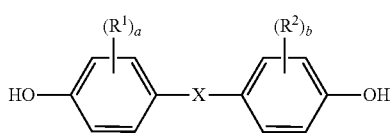
(1)

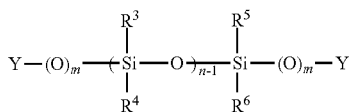
(2)

(in the formula (1), X, $R^1$ and $R^2$, and a and b each have the same meaning as that in the general formula (I), and in the formula (2), $R^3$, $R^4$, $R^5$, and $R^6$ each independently represent a hydrogen atom, or an alkyl group or aryl group which may have a substituent, Y represents a halogen, —$R^7$OH, —$R^7$COOH, —$R^7$NH$_2$, —COOH, or —SH, $R^7$ represents a linear, branched, or cyclic alkylene group, an aryl-substituted alkylene group, an aryl-substituted alkylene group which may have an alkoxy group on its ring, or an arylene group, m represents 0 or 1, and n represents the average number of repeating units of an organosiloxane constituent unit and represents an integer of 30 to 500), and phosgene, a carbonate, or a chloroformate.

In the polycarbonate-based resin composition of the present invention, various kinds of phenols are cited as the dihydric phenol represented by the general formula (1) used as a raw material of (A-1) the polycarbonate-polyorganopolysiloxane copolymer. In particular, 2,2-bis(4-hydroxyphenyl)propane (commonly called bisphenol A) is suitable.

As a bisphenol other than bisphenol A, there are given, for example: bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-t-butylphenyl)propane, 2,2-bis(4-hydroxy-3-bromophenyl)propane, 2,2-bis(4-hydroxy-3,5-tetramethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl) cyclododecane; dihydroxyaryl ethers such as 4,4'-dihydroxyphenyl ether and 4,4'-dihydroxy-3,3'-dimethylphenyl ether; dihydroxydiaryl sulfides such as 4,4'-dihydroxydiphenyl sulfide, and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; dihydroxydiarylfluorenes such as 9,9-bis(4-hydroxyphenyl)fluorene and 9,9-bis(4-hydroxy-3-methylphenyl)fluorene; bis(4-hydroxyphenyl)diphenylmethane; dihydroxydiaryladamantanes such as 1,3-bis(4-hydroxyphenyl)adamantane, 2,2-bis(4-hydroxyphenyl)adamantane, and 1,3-bis(4-hydroxyphenyl)-5,7-dimethyladamantane; 4,4'-[1, 3-phenylenebis(1-methylethylidene)]bisphenol; 10,10-bis (4-hydroxyphenyl)-9-anthrone; and 1,5-bis(4-hydroxyphenylthio)-2,3-dioxapentaene.

These dihydric phenols may each be used alone or as a mixture of two or more kinds.

Examples of the polyorganosiloxane represented by the general formula (2) include the following compounds.

[Chem. 4]

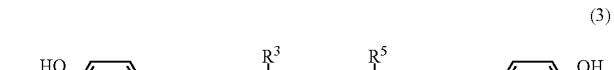
(3)

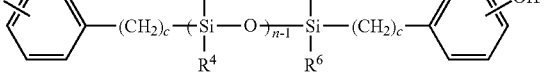
(4)

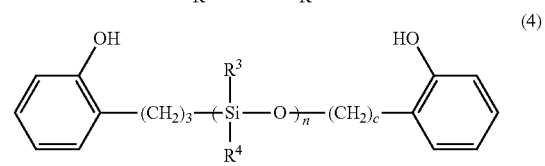
(5)

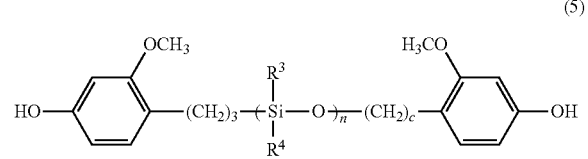
(6)

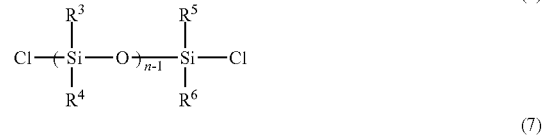
(7)

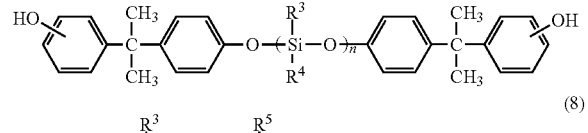
(8)

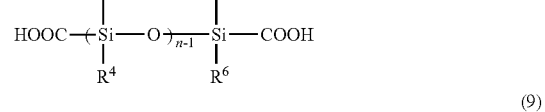
(9)

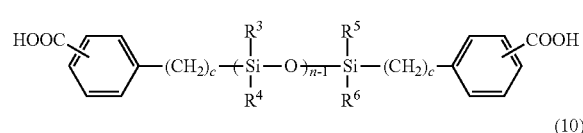
(10)

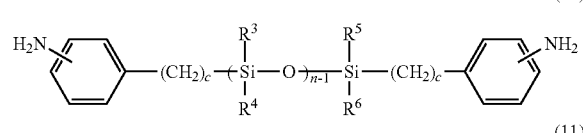
(11)

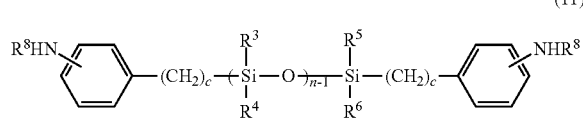

(In the general formulae (3) to (11), $R^3$, $R^4$, $R^5$, and $R^6$ each independently represent a hydrogen atom or an alkyl or aryl group which may have a substituent as in the case of the general formula (1), $R^8$ represents an alkyl, alkenyl, aryl, or aralkyl group, n represent the average number of repeating units of an organosiloxane constituent unit and represents an integer of 30 to 500, and c represents a positive integer.)

Of those, the phenol-modified polyorganosiloxane represented by the formula (3) is preferred because of its ease of polymerization, and α,ω-bis[3-(o-hydroxyphenyl)propyl]polydimethylsiloxane as a kind of the compounds represented by the formula (4) and α,ω-bis[3-(4-hydroxy-3-methoxyphenyl)propyl]polydimethylsiloxane as a kind of the compounds represented by the formula (5) are preferred because of their ease of obtainment.

The polyorganosiloxane represented by the general formula (2) can be easily produced by performing a hydrosilanation reaction between any one of the phenols each having an olefinic, unsaturated carbon-carbon bond, suitably, for example, vinyl phenol, allyl phenol, eugenol, or isopropenyl phenol and a terminal of a polyorganosiloxane chain having a predetermined polymerization degree n.

The average number of repetitions of the constituent unit represented by the general formula (II) in (A-1) the polycarbonate-polyorganosiloxane copolymer is 30 to 500, preferably 70 to 500, more preferably 80 to 400, still more preferably 90 to 300. When the average number of repetitions of the constituent unit represented by the general formula (II) is less than 30, the impact strength of the composition at −40° C. is not sufficient. On the other hand, when the average number of repetitions of the constituent unit represented by the general formula (II) is more than 500, its impact strength at −40° C. and flame retardancy are not sufficient.

The viscosity-average molecular weight (Mv) of (A-1) the polycarbonate-polyorganosiloxane copolymer is preferably 13,000 to 50,000, more preferably 15,000 to 30,000, still more preferably 15,000 to 26,000. When the viscosity-average molecular weight is 13,000 or more, the strength of a molded article becomes sufficient. When the viscosity-average molecular weight is 50,000 or less, productivity does not become reduced.

Next, (A-2) the aromatic polycarbonate resin except the polycarbonate-polyorganosiloxane copolymer is described.

A product obtained by a conventional production method for an aromatic polycarbonate such as an interfacial polymerization method or a pyridine method is used as (A-2) the aromatic polycarbonate resin. The interfacial polymerization method involves: causing a dihydric phenol-based compound and phosgene to react with each other in the presence of an organic solvent inert to the reaction and an alkali aqueous solution; and adding a polymerization catalyst such as a tertiary amine or a quaternary ammonium salt after the reaction to perform polymerization. The pyridine method involves: dissolving the dihydric phenol-based compound in pyridine or a mixed solution of pyridine and the inert solvent; and introducing phosgene to produce the product directly.

A molecular weight modifier (terminal terminator), a branching agent, or the like is used at the time of the above-mentioned reaction as required.

Examples of the dihydric phenol-based compound used in the production of (A-2) the aromatic polycarbonate resin include: bis(hydroxyaryl)alkanes such as 2,2-bis(4-hydroxyphenyl)propane (=bisphenol A), bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane; dihydroxyaryl ethers such as 4,4'-dihydroxyphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; dihydroxydiarylfluorenes such as 9,9-bis(4-hydroxyphenyl)fluorene and 9,9-bis(4-hydroxy-3-methylphenyl)fluorene; bis(4-hydroxyphenyl)diphenylmethane; dihydroxydiaryladamantanes such as 1,3-bis(4-hydroxyphenyl)adamantane, 2,2-bis(4-hydroxyphenyl)adamantane, and 1,3-bis(4-hydroxyphenyl)-5,7-dimethyladamantane; 4,4'-[1,3-phenylenebis(1-methylethylidene)]bisphenol; 10,10-bis(4-hydroxyphenyl)-9-anthrone; and 1,5-bis(4-hydroxyphenylthio)-2,3-dioxapentaene.

These dihydric phenols may each be used alone or as a mixture of two or more kinds.

A molecular weight modifier (terminal terminator) is typically used upon production of (A-2) the aromatic polycarbonate resin.

Any one of the various modifiers typically used in the polymerization of polycarbonate resins can be used as the molecular weight modifier.

To be more specific, as a monohydric phenol, there are given, for example, phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, bromophenol, tribromophenol, monoalkyl phenols each having a linear or branched alkyl group with an average carbon atom number of 12 to 35 at an ortho-, meta-, or para-position, 9-(4-hydroxyphenyl)-9-(4-methoxyphenyl)fluorene, 9-(4-hydroxy-3-methylphenyl)-9-(4-methoxy-3-methylphenyl) fluorene, and 4-(1-adamantyl)phenol.

Of those monohydric phenols, p-t-butylphenol, p-cumylphenol, p-phenylphenol, or the like is preferably used.

As a matter of course, two or more kinds of the compounds may be used in combination.

Further, a branching agent may be used in combination in the range of 0.01 to 3.0 mol %, particularly 0.1 to 1.0 mol %, with respect to the amount of the above-mentioned dihydric phenol-based compounds to obtain a branched polycarbonate. Examples of the branching agent include compounds each having 3 or more functional groups such as 1,1,1-tris(4-hydroxyphenyl)ethane, 4,4'-[1-[4-[1-(4-hydroxyphenyl)-1-methylethyl]phenyl]ethylidene]bisphenol, α, α',α"-tris(4-hydroxyphenyl)-1,3,5-triisopropylbenzene, 1-[α-methyl-α-(4'-hydroxyphenyl)ethyl]-4-[α',α'-bis(4"-hydroxyphenyl)ethyl]benzene, phloroglycine, trimellitic acid, and isatinbis(o-cresol).

In addition, two or more kinds of aromatic polycarbonate resins except (A-1) the polycarbonate-polyorganosiloxane copolymer can be used in combination as (A-2) the aromatic polycarbonate resin as required.

In (A) the resin mixture formed of (A-1) the polycarbonate-polyorganosiloxane copolymer and (A-2) the aromatic polycarbonate resin, the content of the component (A-1) in (A) the resin mixture is 30 to 100 mass %, preferably 40 to 100 mass %, more preferably 50 to 95 mass % in order that the content of the polyorganosiloxane block moiety formed of the constituent unit represented by the general formula (II) may be adjusted to 2 to 30 mass % as described later. This is because of the following reason. When the content of the component (A-1) is less than 30 mass %, the component (A-1) having a relatively large content of the polyorganosiloxane block moiety needs to be used in (A) the resin mixture, and such component (A-1) may be hard to industrially produce.

In addition, the content of the component (A-2) is 70 to 0 mass %, preferably 60 to 0 mass %, more preferably 50 to 5 mass %.

In addition, in (A) the resin mixture, the content of the polyorganosiloxane block moiety formed of the constituent unit represented by the general formula (II) needs to be adjusted to 2 to 30 mass %. The content is preferably 2 to 20 mass %, more preferably 3 to 15 mass %. When the content is less than 2 mass % or more than 30 mass %, compatibility between the impact characteristic at −40° C. and the flame retardancy cannot be achieved.

The polycarbonate-based resin composition of the present invention contains (B) an alkali metal salt and/or alkaline earth metal salt of an organosulfonic acid, and (C) a mixed powder formed of polytetrafluoroethylene particles and organic polymer particles with respect to 100 parts by mass of (A) the resin mixture.

Next, (B) the alkali metal salt and/or alkaline earth metal salt of the organosulfonic acid in the polycarbonate-based resin composition of the present invention are/is described. The component (B) is added to the composition of the present invention for the purpose of, for example, imparting flame retardancy.

The alkali metal salt or alkaline earth metal salt of the organosulfonic acid is an alkali metal salt or alkaline earth metal salt of an organosulfonic acid having at least one carbon atom, though examples thereof include various salts.

Examples of the organosulfonic acid include an organosulfonic acid and a polystyrene sulfonic acid.

Examples of the alkali metal include sodium, potassium, lithium, and cesium.

In addition, examples of the alkaline earth metal include magnesium, calcium, strontium, and barium. Of those, an alkali metal salt containing any one of sodium, potassium, and cesium is preferably used as the salt of the organosulfonic acid.

As the organosulfonic acid, an alkali metal salt and alkali earth metal salt of a perfluoroalkanesulfonic acid each represented by a general formula (12) out of the various alkali metal salts and alkaline earth metal salts of the organosulfonic acid are preferably used.

$$(C_cF_{2c+1}SO_3)_dM \quad (12)$$

(In the formula, c represents an integer of 1 to 10, M represents an alkali metal such as lithium, sodium, potassium, or cesium, or an alkaline earth metal such as magnesium, calcium, strontium, or barium, and d represents the valence of M.)

For example, compounds described in JP 47-40445 B correspond to these metal salt.

Examples of the perfluoroalkanesulfonic acid represented by the general formula (12) include perfluoromethanesulfonic acid, perfluoroethanesulfonic acid, perfluoropropanesulfonic acid, perfluorobutanesulfonic acid, perfluoromethylbutanesulfonic acid, perfluorohexanesulfonic acid, perfluoroheptanesulfonic acid, and perfluorooctanesulfonic acid. In particular, potassium salts thereof are preferably used.

Other examples of the perfluoroalkanesulfonic acid include: an alkyl sulfonic acid, benzenesulfonic acid, an alkylbenzenesulfonic acid, diphenylsulfonic acid, naphthalenesulfonic acid, 2,5-dichlorobenzenesulfonic acid, 2,4,5-trichlorobenzene sulfonic acid, diphenyl sulfone-3-sulfonic acid, diphenyl sulfone-3,3'-disulfonic acid, and naphthalenetrisulfonic acid, and a fluorine substitute thereof; and an alkali metal salt or alkaline earth metal salt of an organosulfonic acid such as a polystyrene sulfonic acid.

In particular, as the organosulfonic acid, a perfluoroalkanesulfonic acid and diphenylsulfonic acid are preferred.

A sulfonate group-containing aromatic vinyl-based resin represented by a general formula (13) can be given as an example of the alkali metal salt and/or alkaline earth metal salt of the polystyrene sulfonic acid.

[Chem. 5]

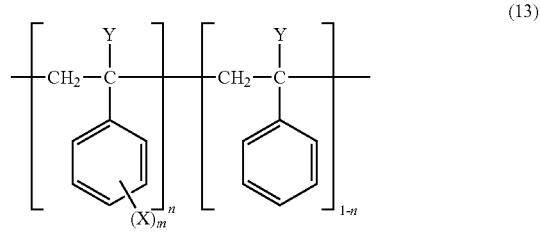

(13)

(In the formula, X represents a sulfonate group, m represents an integer of 1 to 5, Y represents a hydrogen atom or a hydrocarbon group having 1 to 10 carbon atoms, and n represents a molar fraction and satisfies the relationship of $0<n\leq1$.)

Here, the sulfonate group is an alkali metal salt and/or alkaline earth metal salt of a sulfonic acid, and examples of the metals include sodium, potassium, lithium, rubidium, cesium, beryllium, magnesium, calcium, strontium, and barium.

It should be noted that Y represents a hydrogen atom or a hydrocarbon group having 1 to 10 carbon atoms, preferably a hydrogen atom or a methyl group.

m represents an integer of 1 to 5 and n satisfies the relationship of $0<n\leq1$.

That is, the resin may contain an aromatic ring that is totally substituted with the sulfonate group (X), or may contain an aromatic ring that is partially substituted therewith or is unsubstituted.

The content of (B) the alkali metal salt and/or alkaline earth metal salt of the organosulfonic acid is 0.01 to 0.15 part by mass, preferably 0.02 to 0.13 part by mass, more preferably 0.03 to 0.12 part by mass with respect to 100 parts by mass of (A) the resin mixture. When the content is less than 0.01 part by mass or more than 0.15 part by mass, the flame retardancy as a challenge for the present invention is not sufficient.

Next, (C) the mixed powder formed of the polytetrafluoroethylene particles and the organic polymer particles in the polycarbonate-based resin composition of the present invention is described.

The polytetrafluoroethylene particles in (C) the mixed powder formed of the polytetrafluoroethylene particles and the organic polymer particles each have a particle diameter of typically 10 μm or less, preferably 0.05 to 1.0 μm.

The polytetrafluoroethylene particles are prepared as such an aqueous dispersion that the particles are dispersed in water containing, for example, an emulsifier. The aqueous dispersion of the polytetrafluoroethylene particles is obtained by subjecting a tetrafluoroethylene monomer to emulsion polymerization with a fluorine-containing surfactant.

Fluorine-containing olefins such as hexafluoropropylene, chlorotrifluoroethylene, a fluoroalkylethylene, and a perfluoroalkyl vinyl ether, and fluorine-containing alkyl (meth)acrylates such as a perfluoroalkyl (meth)acrylate can each be used as a copolymerizable component upon emulsion polymerization of the polytetrafluoroethylene particles as long as the characteristics of the polytetrafluoroethylene are not impaired.

The content of the copolymerizable component is preferably 10 mass % or less with respect to tetrafluoroethylene in the polytetrafluoroethylene particles.

Next, the organic polymer particles in the component (C) are described.

The organic polymer particles to be used in the present invention, which are not particularly limited, each preferably have an affinity for a polycarbonate resin from the viewpoint of the dispersibility of the polytetrafluoroethylene particles upon blending into (A) the resin mixture.

A monomer for producing the organic polymer particles may be specifically exemplified by: styrene-based monomers such as styrene, p-methylstyrene, o-methylstyrene, p-chlorostyrene, o-chlorostyrene, p-methoxystyrene, o-methoxystyrene, 2,4-dimethylstyrene, and α-methylstyrene; alkyl (meth)acrylate-based monomers such as methyl acrylate, methyl methacrylate, ethyl acrylate, ethyl methacrylate, butyl acrylate, butyl methacrylate, 2-ethylhexyl acrylate, 2-ethylhexyl methacrylate, dodecyl acrylate, dodecyl methacrylate, tridecyl acrylate, tridecyl methacrylate, octadecyl acrylate, octadecyl methacrylate, cyclohexyl acrylate, and cyclohexyl methacrylate; vinyl cyanide-based monomers such as acrylonitrile and methacrylonitrile; vinyl ether-based monomers such as vinyl methyl ether and vinyl ethyl ether; vinyl carboxylate-based monomers such as vinyl acetate and vinyl butyrate; olefin-based monomers such as ethylene, propylene, and isobutylene; and diene-based monomers such as butadiene, isoprene, and dimethylbutadiene. In particular, an alkyl (meth)acrylate-based monomer is preferably used. It should be noted that the term "alkyl (meth)acrylate-based monomer" refers to both alkyl acrylate-based and alkyl methacrylate-based monomers.

The organic polymer particles are obtained by polymerizing any such monomer. One kind of the monomers can be used, or two or more kinds thereof can be used as a mixture. The organic polymer particles are preferably particles formed of an alkyl (meth)acrylate-based copolymer.

The organic polymer particles are prepared as, for example, an aqueous dispersion of the organic polymer particles. Although a method of producing the aqueous dispersion of the organic polymer particles is not particularly limited, an emulsion polymerization method involving using an ionic emulsifier and a soap-free emulsion polymerization method involving using an ionic polymerization initiator can be given as examples thereof.

Any one of an anionic emulsifier, a cationic emulsifier, and an amphoteric ionic emulsifier can be used as the ionic emulsifier. In addition, a nonionic emulsifier can be used in combination with any such ionic emulsifier.

Fatty acid salts, higher alcohol sulfates, liquid fatty oil sulfates, sulfates of aliphatic amines and aliphatic amides, aliphatic alcohol phosphates, sulfonates of dibasic fatty acid esters, fatty acid amide sulfonates, alkyl allyl sulfonates, and naphthalene sulfonates of formalin condensates can be given as examples of the anionic emulsifier.

Aliphatic amine salts, quaternary ammonium salts, and alkyl pyridinium salts can be given as examples of the cationic emulsifier.

An alkyl betaine can be given as an example of the amphoteric emulsifier.

Examples of the ionic polymerization initiator may include: anionic polymerization initiators such as persulfates (e.g., potassium persulfate and ammonium persulfate), azobisisobutyronitrile sulfonate, and 4,4'-azobis(4-cyanovaleric acid); and cationic polymerization initiators such as 2,2'-azobis(amidinopropane)dihydrochloride, 2,2'-azobis[2-(5-methyl-2-imidazolin-2-yl)propane]dihydrochloride, 2,2'-azobis[2-(2-imidazolin-2-yl)propane]dihydrochloride, and 2,2'-azobisisobutyramide dihydrate.

A particle diameter d of each of the organic polymer particles to be used in the present invention, which is not particularly limited, preferably falls within a range represented by the following formula with respect to a particle diameter D of each of the polytetrafluoroethylene particles from the viewpoint of the stability of an agglomerated state with the polytetrafluoroethylene particles.

$$0.1D < d < 10D$$

(C) The mixed powder formed of the polytetrafluoroethylene particles and the organic polymer particles is obtained by, for example, mixing the aqueous dispersion of the polytetrafluoroethylene particles and the aqueous dispersion of the organic polymer particles, and then turning the mixture into a powder by a method to be described later. The mixed powder contains agglomerated particles as a result of the agglomeration of the polytetrafluoroethylene particles and the organic polymer particles caused by their difference in surface charge, and the respective individual particles remaining without undergoing the agglomeration.

Although the agglomerated particles each have such a structure that a polytetrafluoroethylene particle and an organic polymer particle are integrated with each other, various morphologies are available for the agglomerated particles depending on a mixing ratio between both the particles and their particle diameters. That is, for example, such a morphology that a polytetrafluoroethylene particle is surrounded with organic polymer particles, such a morphology that an organic polymer particle is surrounded with polytetrafluoroethylene particles in contrast to the foregoing, and such a morphology that several particles agglomerate with one particle exist.

In order that an agglomeration rate upon mixing of the aqueous dispersions may be reduced, a nonionic emulsifier can be caused to adsorb onto the surface of each of the polytetrafluoroethylene particles and/or the organic polymer particles before the mixing.

The nonionic emulsifier is not particularly limited, and a polyoxyethylene alkyl ether, a polyoxyethylene alkyl allyl ether, a dialkylphenoxypoly(ethyleneoxy)ethanol, a polyvinyl alcohol, a polyacrylic acid, and an alkyl cellulose can be given as examples thereof.

Then, the aqueous dispersions mixed as described above can be turned into a powder by charging the mixture into hot water in which a metal salt such as calcium chloride or magnesium sulfate has been dissolved, and subjecting the resultant to salting out and coagulation, followed by drying or spray drying.

Alternatively, the mixed aqueous dispersion can be turned into a powder by subjecting a monomer having an ethylenically unsaturated bond in the mixed aqueous dispersion to emulsion polymerization, followed by coagulation or spray drying.

The ethylenically unsaturated monomer to be subjected to emulsion polymerization in the mixed aqueous dispersion may be exemplified by: styrene-based monomers such as styrene, p-methylstyrene, o-methylstyrene, p-chlorostyrene, o-chlorostyrene, p-methoxystyrene, o-methoxystyrene, 2,4-dimethylstyrene, and α-methylstyrene; alkyl (meth)acrylate-based monomers such as methyl acrylate, methyl methacrylate, ethyl acrylate, ethyl methacrylate, butyl acrylate, butyl methacrylate, 2-ethylhexyl acrylate, 2-ethylhexyl methacrylate, dodecyl acrylate, dodecyl methacrylate, cyclohexyl acrylate, and cyclohexyl methacrylate; vinyl cyanide-based monomers such as acrylonitrile and methacrylonitrile; vinyl ether-based monomers such as vinyl methyl ether and vinyl ethyl ether; vinyl carboxylate-based monomers such as vinyl acetate and vinyl butyrate; olefin monomers such as ethylene, propylene, and isobutylene; and diene-based monomers such as butadiene, isoprene, prene, and dimethylbutadiene. One kind of those monomers can be used, or two or more kinds thereof can be used as a mixture.

The content of the polytetrafluoroethylene particles in (C) the mixed powder of the present invention is preferably 0.1 to 90 mass %, more preferably 30 to 90 mass %, still more preferably 40 to 90 mass % from the viewpoints of, for example, flame retardancy based on the anti-dripping effect of the resin composition to be obtained, and the external appearance and weld strength of a molded article thereof.

The content of (C) the mixed powder formed of the polytetrafluoroethylene particles and the organic polymer particles in the polycarbonate-based resin composition of the present invention is 0.1 to 1 part by mass, preferably 0.1 to 0.9 part by mass, more preferably 0.2 to 0.8 part by mass with respect to 100 parts by mass of (A) the resin mixture.

When the content of the mixed powder is less than 0.1 part by mass, the anti-dripping performance reduces and hence the flame retardancy cannot be achieved. On the other hand, when the content exceeds 1 part by mass, the ratio of the organic polymer in the composition increases and hence the flame retardancy cannot be achieved.

An additive component that has been regularly used in a polycarbonate-based resin can be added and incorporated into the polycarbonate-based resin composition of the present invention as required for the purpose of, for example, improving its external appearance, preventing its charging, improving its weatherability, or improving its rigidity.

Examples thereof include an antistatic agent, a polyamide-polyether block copolymer (for imparting permanent antistatic performance), a benzotriazole- or benzophenone-based UV absorber, a hindered amine-based light stabilizer (weather-resistant agent), an antibacterial agent, a compatibilizer, and a colorant (a dye or a pigment).

The blending amount of an arbitrary component is not particularly limited as long as the blending amount falls within such a range that the characteristics of the polycarbonate-based resin composition of the present invention are maintained.

The polycarbonate-based resin composition of the present invention is free of an organohalogen-based flame retardant and an organophosphate-based flame retardant. Accordingly, the composition is free of the possibilities of the generation of a harmful gas, the contamination of a molding machine, resin burning, and a reduction in its heat resistance.

Next, a method of producing the polycarbonate-based resin composition of the present invention is described.

The polycarbonate-based resin composition of the present invention is obtained by blending the respective components (A) ((A-1) and (A-2)), (B), and (C) at the ratios, and various arbitrary components to be used as required and any other general component at proper ratios, and kneading the mixture.

The blending and kneading in this case can be performed by a method involving preliminarily mixing the components with a generally used device such as a ribbon blender or a drum tumbler and using a Henschel mixer, a Banbury mixer, a single-screw extruder, a twin-screw extruder, a multi-screw extruder, a co-kneader, or the like.

A heating temperature during the kneading is appropriately selected from the range of 240 to 300° C. in ordinary cases.

It should be noted that a component to be incorporated except the polycarbonate-based resin can be melted and kneaded with the polycarbonate-based resin, that is, can be added as a master batch in advance.

A polycarbonate resin molded article of the present invention is obtained by molding the polycarbonate-based resin composition produced as described above.

Various kinds of the polycarbonate resin molded article of the present invention can be produced by using a composition obtained by melting and kneading the polycarbonate-based resin composition of the present invention with the melt-kneading molding machine or a pellet obtained from the composition as a raw material by an injection molding method, an injection compression molding method, an extrusion molding method, a blow molding method, a press molding method, a vacuum molding method, a foam molding method, and the like.

In particular, a pellet-like molding raw material can be produced by the melt-kneading method and then the pellet can be suitably used in the production of an injection-molded article by injection molding or injection compression molding where releasability is of most concern.

It should be noted that a gas injection molding method for preventing a sink mark in the external appearance of the molded article or for reducing its weight can be adopted as the injection molding method.

The molded article of the present invention obtained by molding the polycarbonate-based resin composition obtained as described above can be used as a material for an outdoor electrical and electronic storage box such as an information communication box, a junction box for photovoltaic power generation, or the like which requires extremely high degrees of impact characteristic and flame retardancy.

EXAMPLES

The present invention is described in more detail by way of examples. However, the present invention is by no means limited by these examples.

Polycarbonate-polydimethylsiloxane Copolymer (PC-PDMS Copolymer) Production Example 1

<Polycarbonate Oligomer Production>

Sodium dithionite is added to a 5.6-mass % aqueous solution of sodium hydroxide at a concentration of 2,000 ppm with respect to bisphenol A (BPA) to dissolve later in the solution. Then, bisphenol A is dissolved in the resultant so that a bisphenol A concentration is 13.5 mass %. Thus, an aqueous solution of sodium hydroxide containing bisphenol A is prepared.

The aqueous solution of sodium hydroxide containing bisphenol A, methylene chloride, and phosgene are continuously passed through a tubular reactor having an inner diameter of 6 mm and a tube length of 30 m at flow rates of 40 L/hr (hereinafter, "L" is an abbreviation of "liter".), 15 L/hr, and 4.0 kg/hr, respectively.

The tubular reactor has a jacket portion, and the temperature of a reaction liquid is kept at 40° C. or less by passing cooling water through the jacket.

The reaction liquid ejecting from the tubular reactor is continuously introduced into a tank type reactor with a baffle having a swept-back blade and an internal volume of 40 L. Further, the aqueous solution of sodium hydroxide containing bisphenol A, a 25-mass % aqueous solution of sodium hydroxide, water, and a 1-mass % aqueous solution of triethylamine are added to the liquid at 2.8 L/hr, 0.07 L/hr, 17 L/hr, and 0.64 L/hr, respectively so that a reaction is performed.

The reaction liquid flooding out of the tank type reactor is continuously extracted, and is then left at rest so that an aqueous phase is separated and removed. Next, a methylene chloride phase is collected.

A polycarbonate oligomer thus is present at a concentration of 329 g/L, and has a chloroformate group concentration of 0.74 mol/L.

<Polycarbonate-polydimethylsiloxane Copolymer Production>

First, 15 L of the polycarbonate oligomer solution of the foregoing, 9.0 L of methylene chloride, 411 g of an o-allyl phenol terminal-denatured polydimethylsiloxane (PDMS) having a repetition number of dimethylsiloxane units of 90, and 8.8 mL of triethylamine are loaded into a 50-L tank type reactor having a baffle board, a paddle type stirring blade, and a cooling jacket. While the mixture is stirred, 1,389 g of a 6.4-mass % aqueous solution of sodium hydroxide are added to the mixture so that a reaction between the polycarbonate oligomer and the allyl phenol terminal-denatured PDMS is performed for 10 minutes.

A solution of p-t-butylphenol (PTBP) in methylene chloride (solution obtainable by dissolving 132 g of PTBP in 2.0 L of methylene chloride) and an aqueous solution of sodium hydroxide containing bisphenol A (solution obtainable by dissolving 1,012 g of bisphenol A in an aqueous solution obtainable by dissolving 577 g of sodium hydroxide and 2.0 g of sodium dithionite in 8.4 L of water) are added to the polymer liquid, and then the mixture is subjected to a polymerization reaction for 50 minutes.

Then, 10 L of methylene chloride are added to the mixture to dilute the mixture, and then the mixture is stirred for 10 minutes. After that, the resultant is separated into an organic phase containing polycarbonate-polydimethylsiloxane copolymer and an aqueous phase containing excessive amounts of bisphenol A and sodium hydroxide, and then the organic phase is isolated.

The solution of the polycarbonate-polydimethylsiloxane copolymer in methylene chloride thus obtainable is sequentially washed with a 0.03-mol/L aqueous solution of sodium hydroxide and 0.2-mol/L hydrochloric acid each having a volume corresponding to 15 vol % of the volume of the solution. Next, the resultant is repeatedly washed with pure water until an electric conductivity in an aqueous phase after the washing becomes 0.01 μS/m or less.

The solution of the polycarbonate-polydimethylsiloxane copolymer in methylene chloride obtainable by the washing is concentrated and pulverized, and then the resultant flake is dried under reduced pressure at 120° C.

The resultant polycarbonate-polydimethylsiloxane copolymer has a PDMS block moiety content determined by nuclear magnetic resonance (NMR) of 6.0 mass %, a viscosity number measurable in conformity with ISO 1628-4 (1999) of 49.5, and a viscosity-average molecular weight Mv of 18,500.

Polycarbonate-polydimethylsiloxane Copolymer (PC-PDMS Copolymer) Production Examples 2 to 9

Polycarbonate-polydimethylsiloxane copolymers are produced by setting the average number of repetitions of the PDMS of the allyl phenol terminal-modified polydimethylsiloxane and the usage thereof, and the usage of p-t-butylphenol as shown in Table 1.

Table 1 shows the PDMS block moiety content (mass %), viscosity number, and viscosity-average molecular weight Mv of each of the polycarbonate-polydimethylsiloxane copolymers.

TABLE 1

| PC-PDMS Copolymer Production Example | 1 | 2 | 3 | 4 | 5 | 6 | 7 | 8 | 9 |
|---|---|---|---|---|---|---|---|---|---|
| Average number of repetitions 1 of PDMS | 90 | 20 | 40 | 700 | 90 | 90 | 90 | 150 | 300 |
| Usage of PDMS (g) | 411 | 411 | 411 | 411 | 685 | 343 | 1,029 | 480 | 411 |
| Usage of PTBP (g) | 132 | 132 | 132 | 132 | 132 | 132 | 132 | 132 | 132 |
| PDMS block moiety content (mass %) | 6 | 6 | 6 | 6 | 10 | 5 | 15 | 7 | 6 |
| Viscosity number | 49.5 | | | | | | | | |
| Viscosity-average molecular weight Mv | 18,500 | | | | | | | | |

Examples 1 to 7 and Comparative Examples 1 to 10

The respective components are mixed at ratios shown in Table 2 (a numerical value for each component in the table represents "part(s) by mass" in a resin composition). Further, the mixture is uniformly mixed with 0.1 part by mass of tris(2,4-di-t-butylphenyl)phosphite (trade name; IRGAFOS168, from BASF) as an antioxidant, and then the whole is pelletized with a vented uniaxial extruder of 50 mmφ at a resin temperature of 280° C. Thus, pellets are obtained.

Molding materials and performance evaluation methods are described below.

(A-1) Polycarbonate-Polydimethylsiloxane Copolymer

The polycarbonate-polydimethylsiloxane copolymers described in Production Examples 1 to 9

(A-2) Aromatic Polycarbonate Resin

A bisphenol A polycarbonate having p-t-butylphenol as a terminal group (trade name; TARFLON FN1900A, from Idemitsu Kosan Co., Ltd., viscosity number=49.5, viscosity-average molecular weight Mv=18,500)

(B) Alkali Metal Salt of Organosulfonic Acid

Potassium perfluorobutanesulfonate (trade name; Megafac F114, from Dainippon Ink & Chemicals, Inc.)

(C) Mixed Powder obtainable by formation from Polytetrafluoroethylene (PTFE) Particles and Organic Polymer Particles

PTFE-1

A mixed powder obtainable by formation from polytetrafluoroethylene particles and an alkyl (meth)acrylate-based copolymer; PTFE content: about 50 to 60 mass % (trade name; A3800, from MITSUBISHI RAYON CO., LTD.)

PTFE that is not the component (C) of the present application

PTFE-2

A polyfluoroolefin resin (trade name; CD076, from ASAHI GLASS CO., LTD.)

PTFE-3

An aqueous dispersion of a PTFE; PTFE content: about 60 mass % (trade name; AD938L, from ASAHI GLASS CO., LTD.)

(D) Phosphate Compound

Resorcinol bis(dixylenylphosphate) (trade name; FP500, from DAIHACHI CHEMICAL INDUSTRY CO., LTD.)

(Performance Evaluations)

The pellets obtainable by the method are subjected to injection molding with an injection molding machine (model number; IS100EN, from TOSHIBA MACHINE CO., LTD.) under the molding conditions of a cylinder temperature of 280° C. and a die temperature of 80° C. Thus, test pieces are obtained. The resultant test pieces are subjected to the following measurements.

(1) Impact Test (Impact Strength)

A notched Izod impact test is performed in conformity with ASTM D256 at each of 23° C. and −40° C.

(2) Combustibility

Molded articles each having a test piece thickness of $\frac{1}{16}$ inch are subjected to a UL94 vertical flame retardancy test specified by the Underwriters Laboratories, Inc. in the U.S., and are then evaluated for their combustibility by being classified into V-0, V-1, and V-2.

TABLE 2

| | | | Example 1 | Example 2 | Example 3 | Example 4 | Example 5 | Example 6 | Example 7 | Comparative Example 1 | Comparative Example 2 |
|---|---|---|---|---|---|---|---|---|---|---|---|
| (A-1) | Production Example 1 (1 = 90) | Part(s) by mass | 80 | | 80 | 80 | | | | | |
| | Production Example 2 (1 = 20) | Part(s) by mass | | | | | | | | 80 | |
| | Production Example 3 (1 = 40) | Part(s) by mass | | 80 | | | | | | | |
| | Production Example 4 (1 = 700) | Part(s) by mass | | | | | | | | | 80 |
| | Production Example 5 (1 = 90) | Part(s) by mass | | | | | | | | | |
| | Production Example 6 (1 = 90) | Part(s) by mass | | | | | | | | | |
| | Production Example 7 (1 = 90) | Part(s) by mass | | | | | 70 | | | | |
| | Production Example 8 (1 = 150) | Part(s) by mass | | | | | | 60 | | | |
| | Production Example 9 (1 = 300) | Part(s) by mass | | | | | | | 80 | | |
| (A-2) | TARFLON FN1900A | Part(s) by mass | 20 | 20 | 20 | 20 | 30 | 40 | 20 | 20 | 20 |
| (B) | Megafac F114 | Part(s) by mass | 0.03 | 0.05 | 0.12 | 0.03 | 0.1 | 0.05 | 0.05 | 0.03 | 0.03 |
| (C) | PTFE-1 | Part(s) by mass | 0.3 | 0.2 | 0.3 | 0.8 | 0.5 | 0.2 | 0.3 | 0.3 | 0.3 |
| Other PTFEs | PTFE-2 | Part(s) by mass | — | — | — | — | — | — | — | — | — |
| | PTFE-3 | Part(s) by mass | — | — | — | — | — | — | — | — | — |
| (D) | FP500 | Part(s) by mass | — | — | — | — | — | — | — | — | — |
| PDMS block moiety content in (A-1) + (A-2) | | Mass% | 4.8 | 4.8 | 4.8 | 4.8 | 10.5 | 4.2 | 4.8 | 4.8 | 4.8 |
| Evaluation | Notched Izod impact strength (23° C.) | kJ/m² | 84 | 78 | 85 | 81 | 82 | 80 | 83 | 73 | 75 |
| | Notched Izod impact strength (−40° C.) | kJ/m² | 64 | 43 | 60 | 57 | 60 | 58 | 60 | 19 | 48 |
| | UL94 combustibility ($\frac{1}{16}$ inch) | | — | V-0 | V-0 | V-0 | V-0 | V-0 | V-0 | V-0 | V-1 |

| | | | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| (A-1) | Production Example 1 (1 = 90) | Part(s) by mass | 80 | 80 | | | 20 | 80 | | 80 |
| | Production Example | Part(s) | | | | | | | | |

TABLE 2-continued

|  |  |  |  |  |  |  |  |  |  |  |
|---|---|---|---|---|---|---|---|---|---|---|
|  | 2 (l = 20) | by mass Part(s) |  |  |  |  |  |  |  |  |
|  | Production Example 3 (l = 40) | by mass Part(s) |  |  |  |  |  |  |  |  |
|  | Production Example 4 (l = 700) | by mass Part(s) |  |  |  |  |  |  |  |  |
|  | Production Example 5 (l = 90) | by mass Part(s) |  |  | 90 |  |  |  |  |  |
|  | Production Example 6 (l = 90) | by mass Part(s) |  |  |  | 80 |  |  |  |  |
|  | Production Example 7 (l = 90) | by mass Part(s) |  |  |  |  |  |  |  |  |
|  | Production Example 8 (l = 150) | by mass Part(s) |  |  |  |  |  |  |  |  |
|  | Production Example 9 (l = 300) | by mass Part(s) |  |  |  |  |  |  |  |  |
| (A-2) | TARFLON FN1900A | Part(s) by mass | 20 | 20 | 10 | 20 | 80 | 20 | 100 | 20 |
| (B) | Megafac F114 | Part(s) by mass | 0.03 | 0.03 | 0.05 | — | 0.03 | 0.03 | 0.03 | — |
| (C) | PTFE-1 | Part(s) by mass | — | — | — | 0.5 | 0.3 | 1.5 | 0.3 | 0.3 |
| Other PTFEs | PTFE-2 | Part(s) by mass | 0.3 | — | — | — | — | — | — | — |
|  | PTFE-3 | Part(s) by mass | — | 0.3 | — | — | — | — | — | — |
| (D) | FP500 | Part(s) by mass | — | — | — | — | — | — | — | 7 |
| PDMS block moiety content in (A-1) + (A-2) |  | Mass% | 4.8 | 4.8 | 9.0 | 4.0 | 1.2 | 4.8 | 0 | 4.8 |
| Evaluation | Notched Izod impact strength (23° C.) | kJ/m² | 83 | 84 | 83 | 85 | 75 | 80 | 73 | 76 |
|  | Notched Izod impact strength (−40° C.) | kJ/m² | 27 | 31 | 59 | 64 | 18 | 51 | 5 | 14 |
|  | UL94 combustibility (1/16 inch) | — | V-0 | V-0 | V-2 | V-1 | V-1 | V-1 | V-1 | V-0 |

As is apparent from Examples 1 to 7, the Izod impact strength of the molded body of the polycarbonate-based resin composition of the present invention is 40 kJ/m² or more at each of 23° C. and −40° C., and hence a high impact characteristic is obtained even at low temperature. In addition, the molded body shows high flame retardancy because the result of the evaluation for combustibility is V-0 in each of the examples.

On the other hand, the impact characteristic at low temperature reduces in each of the cases where the average number of repetitions of the PDMS, i.e., the constituent unit represented by the general formula (II) in the component (A-1) is less than 30 and more than 500 like Comparative Examples 1 and 2. In addition, the impact characteristic at low temperature reduces in the case where the polytetrafluoroethylene that is not the component (C) of the present application is used like Comparative Examples 3 and 4.

The flame retardancy reduces in each of the case where the component (B) or (C) is not added like Comparative Examples 5 and 6, and the case where the amount of the component (C) exceedes 1 part by mass like Comparative Example 8. In each of Comparative Examples 7 and 9, both the impact characteristic at −40° C. and the flame retardancy reduce because the content of the component (A-1) in the polycarbonate-based resin (A) is less than 30 mass % and the PDMS block moiety content in the component (A) is less than 2 mass %.

Further, the impact characteristic at low temperature reduces in the case where the phosphate compound as (D) the organophosphate-based flame retardant is added like Comparative Example 10.

INDUSTRIAL APPLICABILITY

According to the present invention, there can be provided a polycarbonate-based resin composition that is free of the possibilities of the generation of a harmful gas and the like, and brings together an excellent impact characteristic and excellent flame retardancy. In addition, a molded article formed of the composition can be used as a material for an outdoor electrical and electronic storage box such as an information communication box, a junction box for photovoltaic power generation, or the like which requires extremely high degrees of impact characteristic and flame retardancy.

The invention claimed is:

1. A polycarbonate-based resin composition, comprising:
   (A) 100 parts by mass of a resin mixture comprising
      (A-1) from 40 to 100 mass% of a polycarbonate-polyorganosiloxane copolymer comprising a constituent unit represented by formula (I):

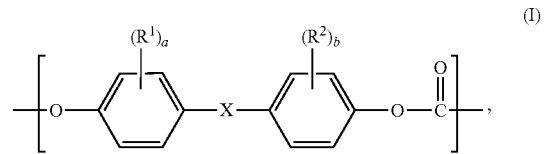

and a constituent unit represented by a general formula (II):

wherein an average number of repetitions of the constituent unit represented by formula (II) is 80 to 500, and
(A-2) from 60 to 0 mass % of an aromatic polycarbonate resin except the polycarbonate-polyorganosiloxane copolymer (A-1);
(B) 0.01 to 0.15 part by mass of an alkali metal salt, an alkaline earth metal salt, or both, of an organosulfonic acid; and
(C) 0.1 to 1 part by mass of a mixed powder comprising polytetrafluoroethylene particles and organic polymer particles,
wherein:
a content of a polyorganosiloxane block moiety comprising the constituent unit represented by formula (II) in the resin mixture (A) is 2 to 30 mass %;
the composition is free of an organohalogen-based flame retardant and an organophosphate-based flame retardant;
$R^1$ and $R^2$ each independently represent an alkyl group or alkoxy group having 1 to 6 carbon atoms;
X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—;
$R^3$ and $R^4$ each independently represent a hydrogen atom, or an alkyl group or aryl group optionally comprising a substituent;
a and b each independently represent an integer of 0 to 4;
I represents an average number of repeating units and represents an integer of 80 to 500;
a notched Izod impact strength of the composition at 23° C. is at least 78 kJ/m$^2$;
a notched Izod impact strength of the composition at −40° C. is greater than 43 kJ/m$^2$;
and
the composition is free of an organic polymer that comprises styrene, a (meth)acrylate-based monomer, and butadiene.

2. The composition according to claim 1, comprising, as the organosulfonic acid (B), an alkali metal salt, an alkaline earth metal salt, or both, of a perfluoroalkanesulfonic acid.

3. The composition according to claim 1, comprising, as the organic polymer particles of the mixed powder (C), particles comprising an alkyl (meth)acrylate-based copolymer.

4. A molded article obtained by molding the polycarbonate-based resin composition according to claim 1.

5. The composition according to claim 2, comprising, as the organic polymer particles of the mixed powder (C), particles comprising an alkyl (meth)acrylate-based copolymer.

6. A molded article obtained by molding the polycarbonate-based resin composition according to claim 2.

7. A molded article obtained by molding the polycarbonate-based resin composition according to claim 3.

8. The composition according to claim 1, wherein the resin mixture (A) consists of at least one polycarbonate-polyorganosiloxane copolymer (A-1) and optionally at least one aromatic polycarbonate resin other than the polycarbonate-polyorganosiloxane copolymer (A-1).

9. The composition according to claim 1, wherein the resin mixture (A) comprises from to 40 to 95 mass% of the polycarbonate-polyorganosiloxane copolymer (A-1) and from 60 to 5 mass% of the aromatic polycarbonate resin except the polycarbonate-polyorganosiloxane copolymer (A-1).

* * * * *